United States Patent [19]

Lotz

[11] Patent Number: 4,807,718
[45] Date of Patent: Feb. 28, 1989

[54] ACOUSTIC NOISE CONTROL FOR FANS

[75] Inventor: Robert Lotz, Greton, Mass.

[73] Assignee: Digital Equipment Corporation, Maynard, Mass.

[21] Appl. No.: 163,397

[22] Filed: Mar. 2, 1988

Related U.S. Application Data

[63] Continuation-in-part of Ser. No. 027,523, Mar. 18, 1987, abandoned.

[51] Int. Cl.⁴ .............................................. H02K 5/24
[52] U.S. Cl. ..................................... 181/202; 181/225
[58] Field of Search ................ 181/205, 225, 226, 202

[56] References Cited

U.S. PATENT DOCUMENTS 3,540,547 11/1970 Coward, Jr. ......................... 181/225
3,799,703 3/1974 Paine et al. ..................... 181/202 X
4,596,925 6/1986 Hersh et al. ..................... 181/225 X Primary Examiner—B. R. Fuller
Attorney, Agent, or Firm—Hayes, Soloway, Hennessey & Hage

[57] ABSTRACT

Apparatus for the abatement of noise from cooling fans primarily in computer and business equipment. Noise of mechanical origin is reduced by damping the fan casing, by mass-loading the casing (at low frequencies), by isolating the casing from its surrounds, and by absorbing some of the noise as it is radiated from the fan casing. The foregoing functions are accomplished by a three-part assembly comprising an elastomeric damping-absorption-isolation collar, a massive high inertia collar, and a secondary isolator, which are inserted between the fan and its supportive structure. The assembly also supports the fan without loose fasteners attached to the fan.

18 Claims, 4 Drawing Sheets

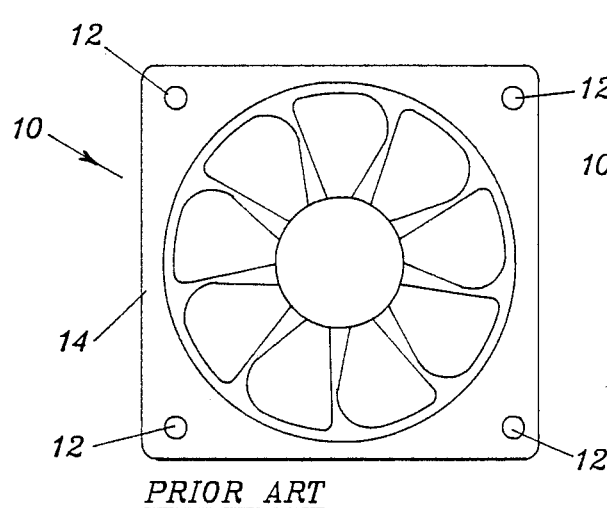
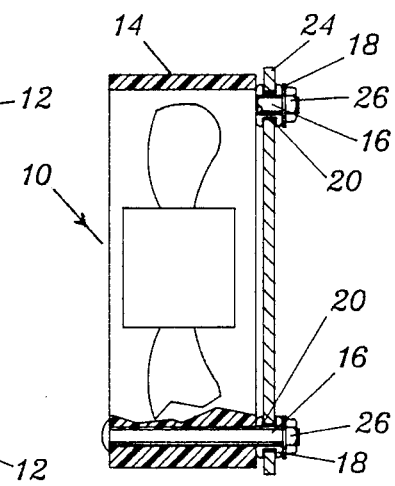
*Fig. 1* PRIOR ART
*Fig. 2* PRIOR ART
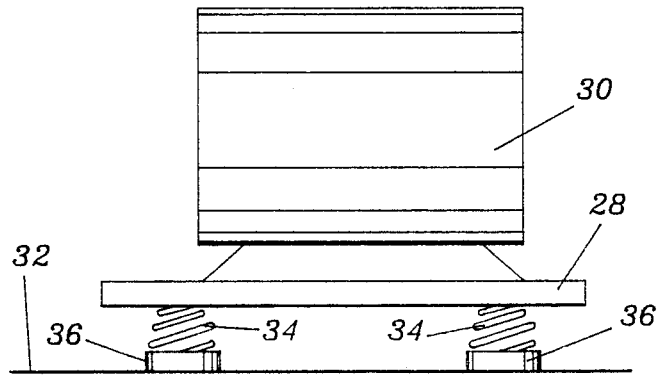
*Fig. 3* PRIOR ART

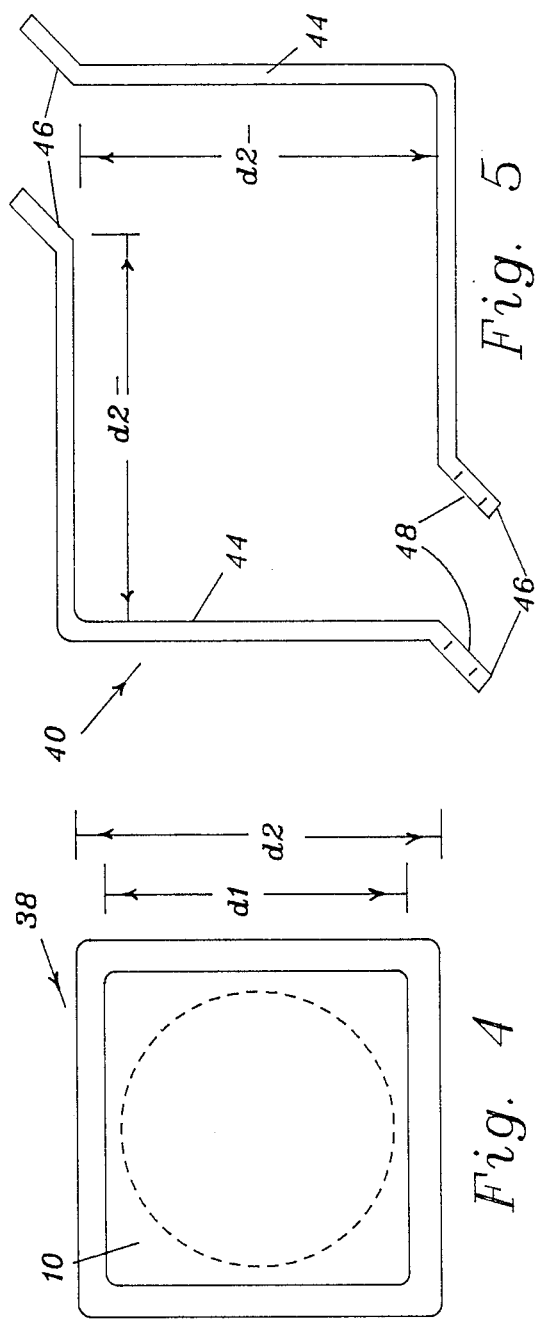
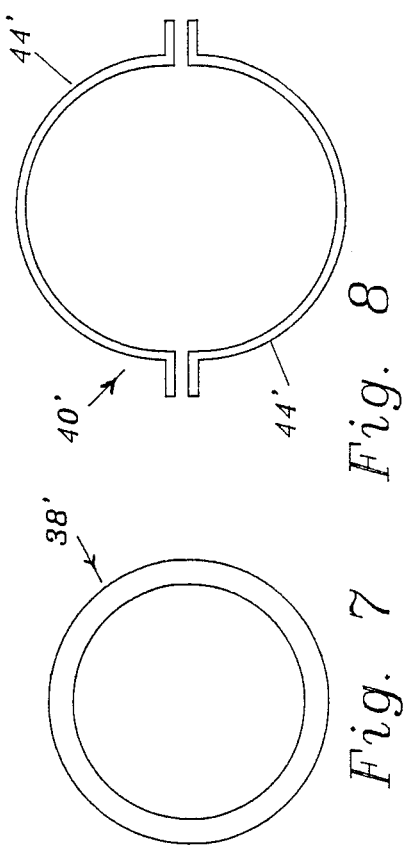

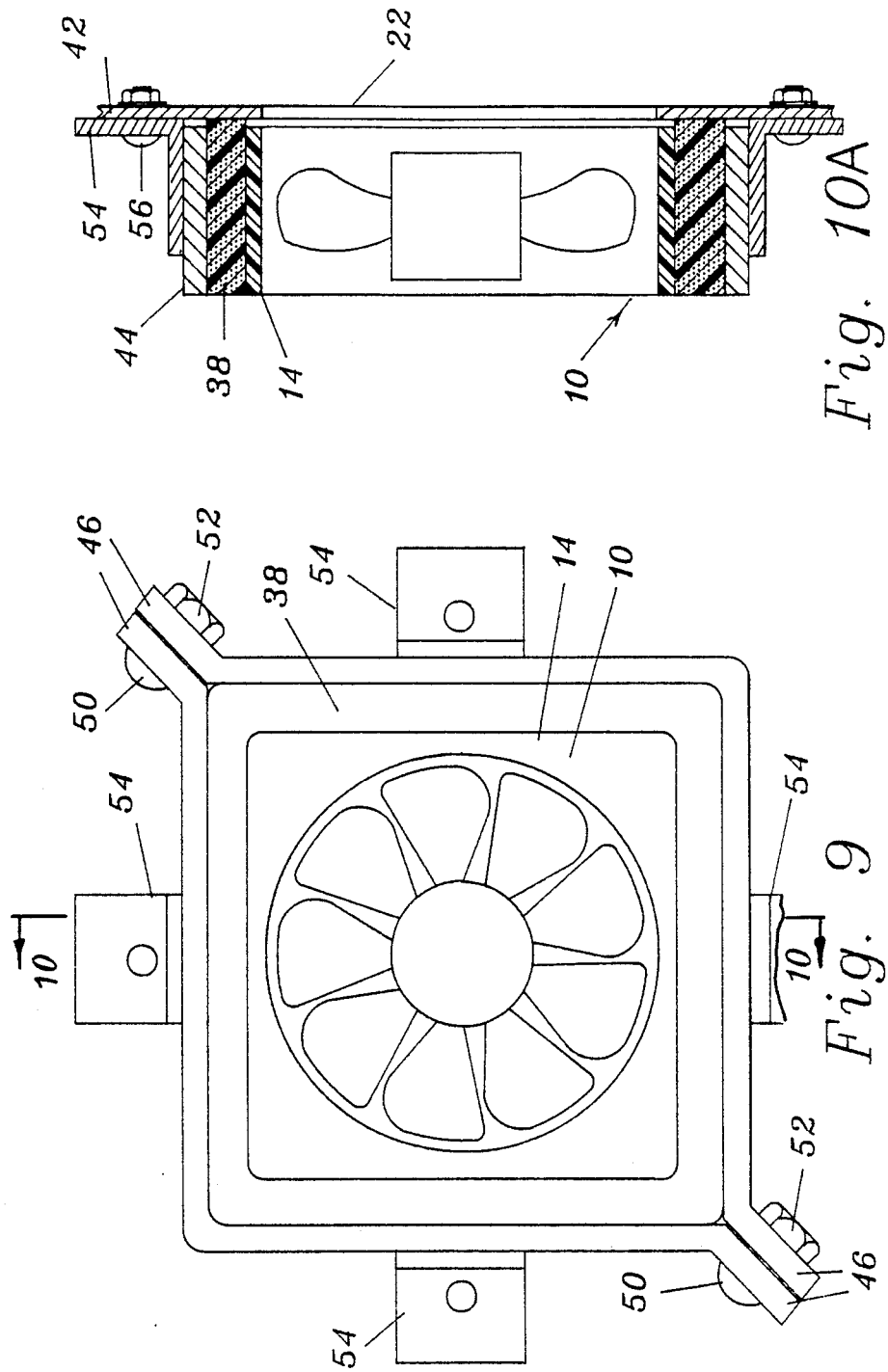

ACOUSTIC NOISE CONTROL FOR FANS

BACKGROUND OF THE INVENTION

The present application is a continuation-in-part of my copending application, Ser. No. 027,523, filed Mar. 18, 1987 now abandoned.

The present invention relates to noise control apparatus and, more particularly, to an acoustic noise control mounting for mounting a fan having a case surrounding a rotating blade assembly to a support structure having a cooling opening therein.

Noise in the workplace is both undesirable, and in some instances, may even run afoul of employee health and safety regulations such as those set by OSHA, and the like. In normally quiet environments, such as law offices, banks and such, noise from the cooling fans used in computers and other business equipment can be quite annoying. In the past, mechanically induced noise from cooling fans used in computer and business equipment was generally controlled by vibrationisolating the fan from its supporting structure such as with elastomeric grommets as depicted in FIGS. 1 and 2. As shown therein, a standard "muffin fan" 10 commonly used for cooling in electronic equipment has mounting holes 12 in the case 14 through which bolts 16 are passed. The bolts 16, in turn pass through rubber grommets 18 in the mounting holes 20 surrounding a cooling opening 22 in the side of the equipment case 24 to be fastened by nuts 26. Another small prior art fan used for cooling electronic equipment (not shown in the drawings) is mounted to a wire guard structure with mounting loops on the end of radially extending "arms" which are mounted to the supporting structure with bolts and grommets in a manner substantially as described above.

Sometimes in the prior art, custom designed isolation schemes have been employed. In one example, a ribbon of resilient elastomeric material is held in place against the fan by rigid lightweight pieces of plastic to obtain noise reduction in the order of 2 to 4 dB. For larger fans, such as those used in heating, ventilation and air-conditioning installations in buildings, inertia bases such as that labelled 28 in FIG. 3 are rigidly attached to the fan motor 30. The fan motor 30 and inertia base 28 are then vibration isolated from the floor 32 of the mechanical equipment room by a combination of steel springs 34 and rubber pads 36. Substantial reduction in vibration levels in the order of 10 to 20 dB could be expected in such cases. Such latter methods of mounting generally are not practical with respect to the small equipment cooling fans.

To obtain a really efficient reduction in fan noise, the sources of the noise itself must be recognized and understood. Noise from fans originates from two very different causes—mechanical/electromagnetic forces or stresses and aerodynamic forces or pressures. Aerodynamic noise is caused by unsteady flow of air in the vicinity of the fan. The unsteadiness results from discrete blades cutting through the air stream; from turbulence caused by sufficiently rapid flow of air over fluid boundaries such as fan rotor, fan case, fan motor, fan struts, and from other causes. Aerodynamic noise originates in the fluid at or near a fluid/solid boundary and is immediately radiated into the surrounding fluid, generally air. The sound energy continues to propagate through the fluid, reaching the exterior of the product, either directly (through fluid-borne paths entirely) or indirectly, transmitting through panels, covers, and the like, to the exterior. In the environment under consideration, aerodynamic noise typically is the least important.

Mechanical noise originates in the mechanical vibration of the fan, caused by unsteady electromagnetic forces, unsteady bearing forces, to some degree unsteady aerodynamic forces, and other causes. This vibratory energy propagates through solid structures as audio frequency vibration (also known as structure-borne sound) and is only radiated into the surrounding fluid at fluid/solid interfaces. From there, it travels as fluid-borne sound to the exterior of the product, either directly (through fluid-borne paths entirely) or indirectly, transmitting through panels, covers, and the like to the exterior. In the absence of damping or vibration isolation, the mechanically or electromagnetically induced vibration propagates from its origin (in the fan) throughout the fan and to the supporting structure. A large area is energized by the vibration and consequently a large area radiates sound in the manner of a sounding or resonating board. Inserting a vibration isolator between the fan and its support as done in the prior art approach of FIGS. 1 and 2 reduces the energized region; but, can also cause the reverberant build-up of vibration on the source side of the isolator. The higher vibration level there reduces the effectiveness of the isolator. Isolators such as the grommets of FIG. 2 also force the fan away from the supporting structure, which provides a path for cooling air other than the cooling opening provided therefor. This results in inefficiency as well as a further source of noise from the recirculating air patterns and turbulence created thereby.

Wherefore, it is an object of the present invention to provide a noise control mounting system for cooling fans, and the like which provides a large reduction in mechanically produced noise.

It is a further object of the present invention to provide a noise control mounting system for cooling fans, and the like, which eliminates noise and inefficiency caused by undesired airflow patterns.

SUMMARY

The foregoing and other objects have been accomplished by the acoustic noise control mounting of the present invention for mounting a fan having a case surrounding a rotating blade assembly to a support structure having a cooling opening therein comprising, an acoustic isolation collar of a damping/absorption/isolation material shaped to fit circumferentially about the fan case; a high inertia collar sized and shaped to fit circumferentially about the acoustic isolation collar and squeeze the acoustic isolation collar under an inward pressure; and, mounting means carried by the high inertia collar for mounting the high inertia collar to the support structure.

In a preferred embodiment of the invention, the acoustic isolation collar is made of open celled polyurethane acoustic foam and the mounting means includes secondary vibration isolation means. Also, the high inertia collar preferably is comprised of two metal half-collars having facing tabs on outer ends thereof having bores therethrough through which assembly bolts and nuts are disposed for holding the two half-collars together and for squeezing the acoustic isolation collar therebetween.

DESCRIPTION OF THE DRAWINGS

FIG. 1 is a simplified front view of a prior art muffin fan having mounting holes provided in the case thereof.

FIG. 2 is a partially cutaway side view of the fan of FIG. 1 showing typical prior art isolation mounting employed therewith.

FIG. 3 is a simplified drawing of an inertia base support for a large fan, or the like, as employed in the prior art for vibrational isolation.

FIG. 4 is a plan view of the acoustic isolation collar employed in the present invention.

FIG. 5 is a plan view of the preferred two part high inertia collar employed in the present invention.

FIG. 6–8 show how the components of FIGS. 4 and 5 could be adapted to be used with a round fan instead of with a rectangular fan.

FIG. 9 is a plan view of a fan assembled in combination with the mounting of the present invention.

FIG. 10A is a partially sectional side view on Section 10—10 of FIG. 9 with the assembly attached to a support structure over a cooling opening.

DESCRIPTION OF THE PREFERRED EMBODIMENT

Figure 10B:
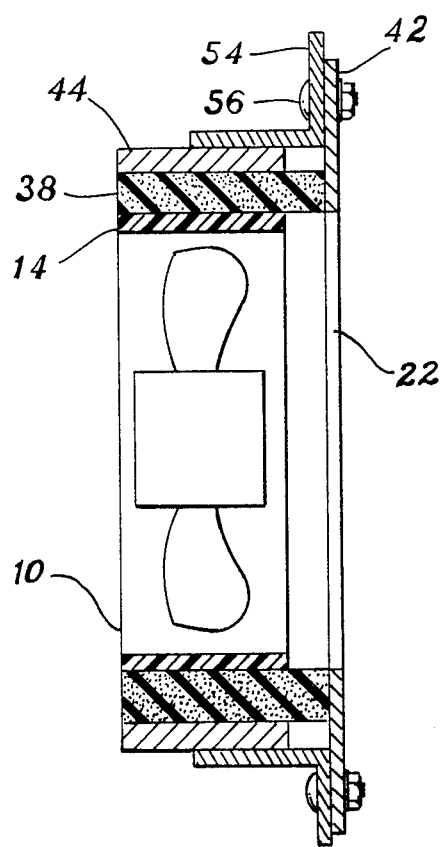
FIG. 10B is a view, similar to FIG. 10A of an alternative embodiment of acoustic isolation mounting in accordance with the present invention.

The present invention will be described hereinafter principally with reference to FIGS. 4, 5, 9 and 10. The major components of the present invention which permit a vast improvement over the prior art are the acoustic isolation collar 38 of FIG. 4 and the high inertia collar 40 of FIG. 5. The acoustic isolation collar 38 is molded of a damping/absorption/isolation material (hereinafter referred to as "DIAM") which preferably comprises an open celled polyurethane "acoustic foam" of a type well known to those skilled in the art which can be obtained from numerous sources.

As will be realized from the description hereinafter, the present inventionaccomplishes a multitude of functions, including (a) damping of the fan vibration by the DAIM; (b) containment and absorption of significant fraction of vibration-induced sound from the fan by the DAIM in conjunction with the high inertia collar; (c) vibration isolation of the fan from the supporting structure by the DAIM in conjunction with the high inertia collar; (d) inertial reduction of fan vibration by the high inertia collar at lower frequencies; (e) damping of any vibration of the high inertia collar by the DAIM; (f) secondary vibration isolation of the high inertia collar from the supporting structure by secondary isolators; (g) essentially air-tight sealing of the fan to its immediate support (i.e. the high inertial collar) by the DAIM; and (h) physical support of the fan, without any screws or other fasteners attaching to the fan, by the DAIM and the high inertia collar.

It should be noted that it is not necessary for all the foregoing functions to be accomplished for the present invention to provide substantial benefits over the prior art; but, each adds to the utility and value thereof.

The description of the tested embodiment contained hereinafter is of apparatus employed with a square muffin fan such as that labelled 10 and previously discussed with respect to FIGS. 1 and 2. As shown in FIG. 4, the present invention employs an acoustic isolation collar 38 of DIAM sized and shaped to fit circumferentially about the case 14 of the fan 10. Since the shape of the case 14 is regular, i.e. square, the inner shape of the collar 38 is also a square. If the case was irregular in shape, it would be preferred to mold the collar 38 to have an internal shape substantially identical to the exterior circumferential shape of the case. As shown in FIGS. 6 and 7, for example, if the fan 10' had a circular case 14', the acoustic isolation collar 38' would preferably be cylindrical in shape.

The preferred construction for the high inertia collar 40 is as shown in FIG. 5. Collar 40 is comprised of two identical steel half-collars 44 each having mating tabs 46 extending from the ends thereof. The tabs 46 have bores 48 therethrough through which bolts 50 can be passed to fasten the two half-collars together with nuts 52 as shown in FIG. 9. The sides of the two half-collars 44 are of length "d2-" which is slightly less than the length "d2" of the outer sides of the acoustic isolation collar 38 so that the acoustic isolation collar 38 is squeezed against the outside of the case 14 by the collar 40 as the two half-collars 44 are bolted together. Again, as shown in FIGS. 6–8, if the fan 10' was circular and the collar 38' was cylindrical, the half-collars 44' would be preferably semi-cylindrical in shape. It should be understood that the high inertia collar 40 is, as the name implies, constructed of heavy weight steel, iron, or the like so as to have substantial weight with respect to the weight of the fan 10. It is preferred that the high inertia collar 40 have a mass at least two to three times that of the fan 10. A light-weight metal or plastic band or strap would not have sufficient mass and, therefore, inertia to perform as required by the present invention.

Turning now to FIGS. 9 and 10A, the present invention is shown being used to mount the fan 10 to a supporting structure 42 over a cooling opening 22 under acoustic noise controlling conditions. To effect the actual attaching of the fan/collar/collar assembly 10, 38, 40 to the supporting structure 42 in a preferred manner, mounting tabs 54 are attached to the half-collars 44 as shown in FIG. 9 by suitable fastening means such as isolation bolt/nuts 56 sold commercially as Wellnuts (TM). It is preferred to mount the fan/collar/collar assembly 10, 38, 40 spaced from supporting structure 42, preferably through an additional isolator so as to obtain the maximum noise abatement possible with the present invention.

Alternatively, as shown in FIG. 10B, acoustic isolation collar 38 may extend beyond the fan and collar 10, 40 in contact with supporting structure 42. In such case it is preferred that collar 38 extend at least one and preferably at least one and one-half times its thickness.

Having thus described the physical attributes and construction of the present invention, the operaton thereof and the benefits obtained thereby over the prior art as obtained from actual testing by the applicant will now be discussed briefly.

The present invention as hereinbefore described provides a superior reduction of mechanically (or electromechanically) caused noise compared to vibration isolation alone. This can be explained as follows: Since the actual source of vibration is more localized than the entire fan itself, it is desirable to confine the extent of fan vibration as much as possible to that local region. In the present invention, this is accomplished by damping the fan body or case. A simple test reveals that the DAIM does indeed damp the fan. If the fan alone is supported by a string and is struck sharply by a firmly held coin, the fan sounds metallic. This indicates that the natural frequencies have ben excited and that they persist, thus that damping is low. If the fan is placed in the collar/collar assembly 38, 40 of the present invention and the experiment repeated, the duller, more wooden sound is heard, indicating that the assembly provides damping. The effect of damping the fan with the DAIM is to reduce the amplitude and extent of mechanical vibration, and thus to reduce the amount of noise radiated directly from the fan. By preventing reverberant buildup of the structure-borne sound on the fan side of the isolator, the damping also makes the isolation more effective. It should be appreciated that even greater damping could be obtained by adhering dedicated damping material directly to the fan body as with adhesive, or the like. However, this approach increases the first cost associated with the special purpose damping material and may render impractical or impossible of the removal of the adhering material and reusing it on any replacement fans.

The effect of damping the massive high inertia collar with the DAIM is also to reduce the amplitude of mechanical vibration of that collar and thus to reduce the amount of noise radiated from that collar. Note that special purpose damping material could also be adhered to the high inertia collar to augment damping from the DAIM. This would incur the additional first cost mentioned above, but not the replacement costs associated with replacing special purpose damping applied to the fan.

The effect of surrounding the exterior surface of the fan with absorption nearly enclosed by a rigid massive surface is to contain and absorb sound that would otherwise be radiated from the perimeter of the fan. Generally, one need be concerned primarily here with higher frequency sound, corresponding to wavelengths in air shorter than, for example, ten times the fan thickness. For a fan 1.5 inches thick, this would correspond to a wavelength of 15 inches and frequencies about 900 Hz. Lower frequency sound will not radiate effectively from the isolated fan.

By similar reasoning, it generally is not critical to prevent the transmisson of lower frequency structure-borne sound to the surrounding massive high inertia collar (its dimensions and therefore its radiation efficiency being similar to the fan) provided the collar is isolated from larger expanses of sheet metal or other potential radiating surfaces as these larger surfaces would radiate the lower frequency sound efficiently.

The isolation of the low frequency structure-borne sound from the supporting structure, and containing it within the fan/collar assembly, where radiation efficiency is low, is accomplished by the secondary isolation where the present invention is attached to the supporting structure. In one tested embodiment, this isolation had a natural frequency of around 35 Hz and isolated frequencies above about 70 Hz.

The massive high inertia collar plays complementary roles at higher and lower frequencies. At higher frequencies, i.e. above twice the first resonance of the fan/collar/collar assembly, the fan vibrates freely, with little reactive force from the DAIM collar. The high inertia collar, however, provides enough mismatch in mechanical impedance that the motion of the DAIM is not transmitted to the high inertia collar. At lower frequencies, i.e. below half the first resonance of the fan/collar/collar assembly (half of 250 Hz in the design currently under commercial testing), the fan and high inertia collar are tightly coupled by the DAIM and appear to the force sources within the fan as a single mass, made several times greater than the fan itself by the addition of the massive collar. Assuming a constant force level, tripling the mass "seen" by the force source reduces vibration levels and noise level by about 10 dB.

It may also be noted and appreciated that the DAIM is the only support for the fan and that the fan is held in place to the high inertia collar by the DAIM without any screws or loose hardware attached to the fan.

As a final comment, in tests conducted by the Applicant herein, the total mounting structure of the present invention as hereinbefore described resulted in a total of 7.7 dB of airborne noise reduction.

Wherefore, having thus described my invention, I claim:

1. An acoustic noise control mounting for mounting a fan having a case surrounding a rotating blade assembly to a support structure having a cooling opening therein comprising:
   (a) an acoustic isolation collar of a damping/absorption/isolation material shaped to fit circumferentially about the fan case;
   (b) a high inertia collar sized and shaped to fit circumferentially about said acoustic isolation collar; and,
   (c) mounting means carried by said high inertia collar for mounting said high inertia collar to the support structure wherein;
   said high inertia collar is sized and shaped to squeeze said acoustic isolation collar under an inward pressure.

2. The acoustic noise control mounting according to claim 1 wherein:
   said acoustic isolation collar is made of open celled polyurethane acoustic foam.

3. The acoustic noise control mounting according to claim 1 wherein:
   said mounting means includes secondary vibration isolation means.

4. The acoustic noise control mounting according to claim 1 wherein:
   said high inertia collar is comprised of two half-collars having facing tabs on outer ends thereof having bores therethrough through which assembly bolts and nuts are disposed for holding said two half-collars together and for squeezing said acoustic isolation collar therebetween.

5. The acoustic noise control mounting according to claim 1 wherein:
   said high inertia collar has a mass at least twice that of the fan.

6. The acoustic noise control mounting according to claim 1 wherein said acoustic isolation collar and said inertia collar are mounted spaced from said support structure.

7. The acoustic noise control mounting according to claim 1 wherein said acoustic isolation collar extends beyond said inertia collar in contact with said support structure.

8. An acoustic noise control mounting for mounting a fan having a case surrounding a rotating blade assembly to a support structure having a cooling opening therein comprising:
   (a) an acoustic isolation collar of a damping/absorption/isolation material shaped to fit circumferentially about the fan case;
   (b) a high inertia collar sized and shaped to fit circumferentially about said acoustic isolation collar, said high inertia collar being comprised of two half-collars having facing tabs on outer end thereof having bores therethrough through which assembly bolts and nuts are disposed for holding said two half-collars together wherein;

said high inertia collar is sized and shaped to squeeze said acoustic isolation collar under an inward pressure; and (c) mounting means carried by said high inertia collar for mounting said high inertia collar to the support structure, said mounting means including additional vibration isolation means.

9. The acoustic noise control mounting according to claim 8 wherein:
said acoustic isolation collar is made of open celled polyurethane acoustic foam.

10. The acoustic noise control mounting according to claim 8 wherein:
said high inertia collar has a mass at least twice that of the fan.

11. The acoustic noise control mounting according to claim 8 wherein said acoustic isolation collar and said high inertia collar are mounted spaced from said support structure.

12. The acoustic noise control mounting according to claim 8 wherein said acoustic isolation collar extends beyond said inertia collar in contact with said support structure.

13. An acoustic noise control mounting for mounting a fan having a case surrounding a rotating blade assembly to a support structure having a cooling opening therein comprising:
(a) a high inertia collar sized and shaped to fit circumferentially about the fan case;
(b) primary isolation means comprising an acoustic isolation collar of a damping/absorption/ isolation material shaped to fit circumferentially about the fan case for attaching said high inertia collar to the fan case in a vibration isolating relationship; and
(c) mounting means carried by said high inertia collar for mounting said high inertia collar to the support structure wherein;

said high inertia collar is sized and shaped to squeeze said acoustic isolation collar under an inward pressure, and said high inertia collar has a mass at least twice that of the fan.

14. The acoustic noise control mounting according to claim 13 wherein:
said acoustic isolation collar is made of open celled polyurethane acoustic foam.

15. The acoustic noise control mounting according to claim 13 wherein:
said mounting means includes secondary vibration isolation means.

16. The acoustic noise control mounting for a fan of claim 13 wherein:
said high inertia collar is comprised of two half-collars having facing tabs on outer ends thereof having bores therethrough through which assembly bolts and nuts are disposed for holding said two half-collars together.

17. The acoustic noise control mounting according to claim 13 wherein said acoustic isolation collar and said high inertia collar are mounted spaced from said support structure.

18. The acoustic noise control mounting according to claim 13 wherein said acoustic isolation collar extends beyond said inertial collar in contact with said support structure.

* * * * *

UNITED STATES PATENT AND TRADEMARK OFFICE
CERTIFICATE OF CORRECTION

PATENT NO. : 4,807,718

DATED : February 28, 1989

INVENTOR(S) : ROBERT LOTZ

It is certified that error appears in the above—identified patent and that said Letters Patent is hereby corrected as shown below:

Claim 8, line 68, "end" should be --ends--.

Signed and Sealed this

Twenty-ninth Day of August, 1989

Attest:

DONALD J. QUIGG

Attesting Officer     Commissioner of Patents and Trademarks